(12) United States Patent
Weinrib

(10) Patent No.: US 9,332,407 B2
(45) Date of Patent: *May 3, 2016

(54) METHOD AND SYSTEM FOR TRANSMISSION AND DISPLAY OF RICH-MEDIA MESSAGES

(71) Applicant: Disney Enterprises, Inc., Burbank, CA (US)

(72) Inventor: Jeremy A. Weinrib, New York, NY (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/788,605

(22) Filed: Jun. 30, 2015

(65) Prior Publication Data

US 2015/0304826 A1   Oct. 22, 2015

Related U.S. Application Data

(63) Continuation of application No. 13/945,699, filed on Jul. 18, 2013, now Pat. No. 9,107,052, which is a continuation of application No. 13/246,667, filed on Sep. 27, 2011, now Pat. No. 8,565,796, which is a continuation of application No. 11/888,412, filed on Jul. 31, 2007, now Pat. No. 8,073,475.

(60) Provisional application No. 60/899,103, filed on Feb. 2, 2007.

(51) Int. Cl.
*H04W 4/22* (2009.01)
*H04W 88/18* (2009.01)
*H04W 4/14* (2009.01)

(52) U.S. Cl.
CPC ........ *H04W 4/14* (2013.01); *H04W 4/22* (2013.01); *H04W 88/18* (2013.01); *H04W 88/181* (2013.01)

(58) Field of Classification Search
CPC ......... H04W 4/14; H04W 4/22; H04W 88/18; H04W 88/181
USPC ....................... 455/466, 414.4, 566
See application file for complete search history.

(56) References Cited

U.S. PATENT DOCUMENTS

| 7,343,168 | B2* | 3/2008 | Valloppillil | 455/466 |
| 8,116,791 | B2* | 2/2012 | Agiv | 455/466 |
| 8,295,863 | B1* | 10/2012 | Gupta et al. | 455/466 |
| 2005/0233758 | A1* | 10/2005 | Salmi | 455/466 |

(Continued)

*Primary Examiner* — Sharad Rampuria
(74) *Attorney, Agent, or Firm* — Farjami & Farjami LLP

(57) ABSTRACT

There is provided a method of processing a rich-media message by a mobile device having a display, a mobile device operating system and a software application. The method includes receiving the rich-media message over a network by the mobile device, depacketizing the rich-media message by the mobile device operating system to retrieve an encoded rich-media message and address data in the rich-media message, and activating the software application on the mobile device by the mobile device operating system based on the address data in the rich-media message. The method also includes decoding the encoded rich-media message by the software application to generate rich-media content information, determining, using the rich-media content information, whether a rich-media element identified by the rich-media content information is resident on the mobile device, and if the determining determines that the rich-media element is resident on the mobile device, displaying the rich-media element on the display.

20 Claims, 6 Drawing Sheets

(56) References Cited

U.S. PATENT DOCUMENTS

| | | | |
|---|---|---|---|
| 2007/0010264 A1* | 1/2007 | Sun et al. | 455/466 |
| 2010/0250780 A1* | 9/2010 | Hsiao et al. | 709/246 |
| 2010/0304766 A1* | 12/2010 | Goyal | 455/466 |
| 2013/0128801 A1* | 5/2013 | Zhu et al. | 370/315 |
| 2014/0342761 A1* | 11/2014 | Kolodziej | 455/466 |

* cited by examiner

METHOD AND SYSTEM FOR TRANSMISSION AND DISPLAY OF RICH-MEDIA MESSAGES

RELATED APPLICATIONS

This application is a Continuation of U.S. patent application Ser. No. 13/945,699, filed Jul. 18, 2013, which is a Continuation of U.S. patent application Ser. No. 13/246,667, filed Sep. 27 2011, now U.S. Pat. No. 8,565,796 which is a Continuation of U.S. patent application Ser. No. 11/888,412, filed Jul. 31, 2007, now U.S. Pat. No. 8,073,475, which is based on and claims priority from U.S. Provisional Application No. 60/899,103, filed on Feb. 2, 2007, which is hereby incorporated by reference in its entirety.

BACKGROUND OF THE INVENTION

1. Field of the Invention

The present invention relates generally to data and voice communications. More particularly, the present invention relates to mobile communications.

2. Background Art

As commerce becomes ever more dependent on the ability to exchange information rapidly, independent of locational constraints, the economic importance of mobile communications becomes correspondingly great. Along with greater reliance on mobile communication devices, comes increased demand for ready, low cost access to graphically rich media, using those devices.

One conventional approach to providing convenient low cost mobile communication involves use of a messaging format known as short message service (SMS). SMS is a character-based short messaging format commonly used for the exchange of text messages between users of mobile devices, for example, mobile telephones, or between a server and a mobile device. Advantages associated with the SMS format include its uniform implementation across all mobile carriers, and all mobile devices available on the market today. Due to its ubiquity, SMS is tightly integrated to mobile device functionality, making SMS messaging easy for a typical user of such a device to utilize for communication purposes.

The SMS format imposes a strict limit on the size of an SMS message, however, constraining messages composed from, for example, 7-bit characters, to a length of 160 characters. Because of such limitations, SMS messages are typically text strings of truncated or abbreviated words, lacking graphical enhancements. Conventional approaches to communicating more visually rich or complex information via SMS messages have been largely unsuccessful in reconciling the character size of a visually complex message with the character constraint imposed by the SMS format.

Another conventional approach to providing richer message content to a mobile device involves use of another messaging format known as multimedia messaging service (MMS). The MMS format was developed with messaging capacity to provide audio, visual, and graphical elements to users of mobile devices. Although sometimes referred to as the evolution of SMS, MMS tends to coexist with SMS on mobile devices, to the extent that MMS has been deployed, and complements SMS messaging rather than functioning as its substitute.

The advantage offered by MMS in delivering rich-media content to mobile users is its messaging capacity, which permits inclusion of rich text, graphics, video, and audio elements in an MMS message. Its disadvantages, however, are numerous, and have prevented MMS from serving as a satisfactory substitute for SMS, despite its capacity for delivering richer content. Disadvantages associated with MMS include lack of uniform implementation across mobile carriers and mobile devices, and higher intrinsic cost for exchange of an MMS message. In addition, and perhaps due to its lack of uniform implementation, MMS does not tend to be tightly integrated to mobile device functionality, and thus requires greater user involvement and expertise for its successful utilization. The difficulty in its use, together with a rigid content format, and greater expense, has prevented MMS from satisfying user demands for a convenient and cost effective means for obtaining rich-media content.

Accordingly, there is a need to overcome the drawbacks and deficiencies in the art by providing a widely implemented, efficient, and low cost means for communicating rich-media messages that are readily accessible to users of common mobile devices.

SUMMARY OF THE INVENTION

A method and system for transmission and display of rich-media alerts, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein.

DETAILED DESCRIPTION OF THE INVENTION

The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention. The specific details not described in the present application are within the knowledge of a person of ordinary skill in the art. The drawings in the present application and their accompanying detailed description are directed to merely exemplary embodiments of the invention. To maintain brevity, other embodiments of the invention, which use the principles of the present invention, are not specifically described in the present application and are not specifically illustrated by the present drawings.

Figure 1:
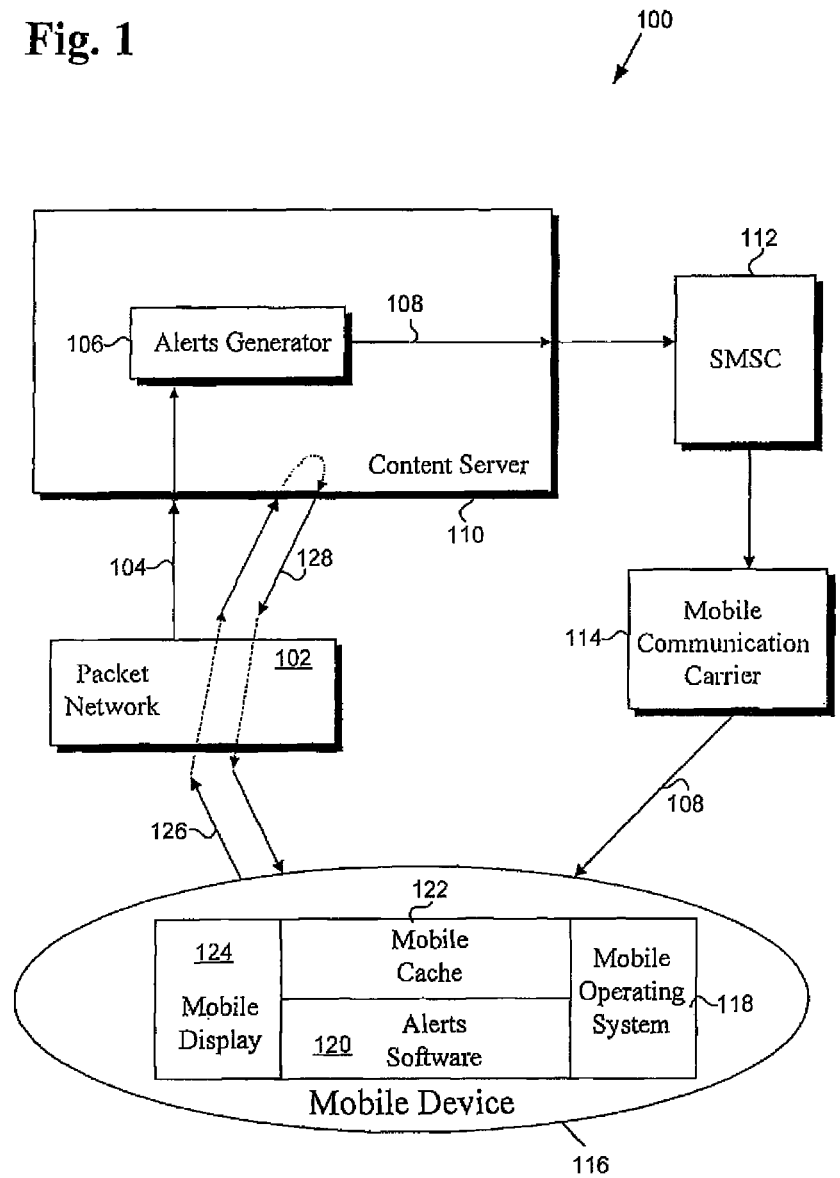
FIG. 1 illustrates a diagram of a communication network for transmission and display of rich-media alerts, in accordance with one embodiment of the present invention.

FIG. 1 illustrates a diagram of communication network 100 for transmission and display of rich-media alerts, in accordance with one embodiment of the present invention. Communication network 100 includes packet network 102, alerts generator 106 residing on content server 110, short message service center (SMSC) 112, mobile communication carrier 114, and mobile device 116 comprising mobile operating system 118, alerts software 120, mobile cache 122, and mobile display 124.

As shown in FIG. 1, alerts generator 106 receives data or message 104 from packet network 102, and encodes message 104 to generate an encoded rich-media message or alert 108, which is then transmitted by content server 110, and received by mobile device 116. In other embodiments, communication network 100 may include more or less elements than are shown in FIG. 1, and data or message 104 may originate from various sources other than packet network 102, including but not limited to human communication, radio transmission, telephone communication, and manual input, for example. Alerts generator 106 packetizes or formats the encoded rich-media message or alert information into a 160-character SMS message, producing rich-media SMS 108. Following encoding and formatting, rich-media SMS 108 is transmitted from content server 110 to SMSC 112 in compliance with small message peer-to-peer (SMPP) package protocols or other data-transmission protocols. Rich-media alert SMS 108 is then relayed to mobile communication carrier 114, and on to mobile device 116.

Mobile device 116 serves as the destination for rich-media alert SMS 108, and may be any device capable of receiving data transmissions directed at software resident on the device, such as a mobile phone or personal digital assistant (PDA), for example. In one embodiment, mobile device 116 comprises alerts software 120, integrated with mobile operating system 118, mobile cache 122 and mobile display 124. According to the present embodiment, mobile operating system 118 responds to address information contained in rich-media SMS 108 by routing it to alerts software 120. Alerts software 120 depacketizes and decodes rich-media alert SMS 108, and may initiate communication with content server 110 via packet network 102. In one embodiment, mobile device 116 sends query 126 to content server 110 seeking authentication and data transfer, for example.

When communication is established between mobile device 116 and content server 110, graphical and multimedia elements 128, as well as configuration update information, and decoding procedures may be downloaded from content server 110 to mobile device 116. In one embodiment, identification of desired graphical and multimedia elements, as well as a reference to their location on content server 110 are contained in rich-media alert SMS 108. As alerts software 120 depacketizes and decodes rich-media alert SMS 108, alerts software 120 distinguishes between optional and required rich-media content, and coordinates retrieval of optional rich-media content from content server 110 and mobile cache 122. In short, mobile device 116 can obtain rich-media display information from content server 110 based on the rich-media information within encoded rich-media message 108. Graphical elements previously downloaded from content server 110 and cached on mobile device 116, as well as graphical elements loaded onto mobile device 116 as part of alerts software 120, are available for viewing on mobile display 124 without additional data download. Those graphical and multimedia elements not previously cached are downloaded for display as part of the rich-media alert.

In one embodiment of the present invention, display of an incoming rich-media alert SMS can be achieved without the above-described communication with content server 110, however. For example, in the event a communication cannot be established between mobile device 116 and content server 110 subsequent to receipt of a rich-media alert SMS, software 120 coordinates display of only those optional rich-media elements previously cached or loaded onto mobile device 116, formatting the alert to compensate for absence of the unavailable elements. Thus, even without establishing a communication with content server 110 subsequent to reception of rich-media alert SMS 108, mobile device 116 may still display an alert with enhanced rich-media components, in contrast to conventional SMS communications.

Communication network 100 can be utilized in, for example, a commercial subscriber network for sports, weather, or news alerts, an emergency services network, a medical alert network, or in any other kind of communications network in which information transfer is enabled or enhanced by inclusion of rich-media elements in voice band messages.

As described above, in one embodiment, the present invention uses the SMS message format utilized for transmission of text messages to transmit rich-media alerts. This is accomplished by sending encoded messages via SMS. One embodiment uses character-based encoding, but others can use bit-based encoding. The coded messages can be self-contained, or they may include information that indicates where additional information and/or rich-media display elements may be obtained from content server 100. Although various embodiments of the present invention are described based on the SMS message format, the present invention is not limited to the SMS message format and other message formats, whether character-based or bit-based, may easily be utilized by the present invention.

Figure 2:
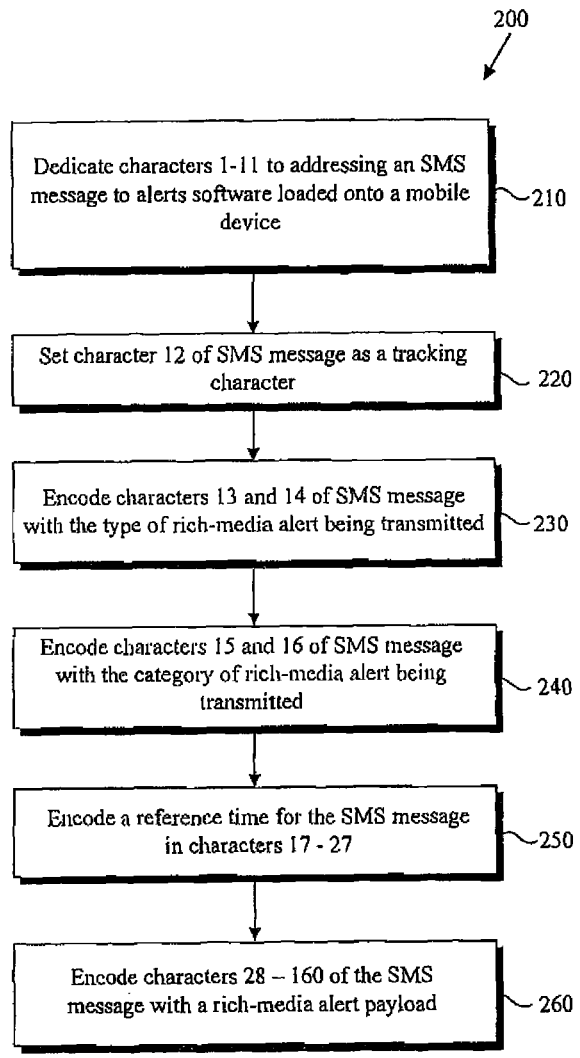
FIG. 2 illustrates a flowchart for encoding rich-media content into an SMS message, according to one embodiment of the present invention.

FIG. 2 illustrates flowchart 200 for encoding rich-media content into an SMS message, according to one embodiment of the present invention. The present embodiment shows a character-based encoding scheme for SMS utilizing 160 characters of 7 bits each, and is exemplary only. Other embodiments may use characters of other lengths, i.e. 8-bit characters, or 16-bit characters, for example. Although not included in flowchart 200, in one embodiment a compression algorithm may be applied to the SMS message before or after encoding.

Referring now to step 210 of flowchart 200 in FIG. 2, at step 210 of flowchart 200, the first eleven characters of a 160-character SMS message are dedicated to address information, in order to direct a rich-media alert SMS to alerts software previously loaded onto a mobile device. When such a mobile device receives a rich-media alert SMS, the mobile operating system identifies the SMS message as rich-media encoded on the basis of the character string portion containing address information. As a result, the mobile operating system activates alerts software 120, and routes the rich-media alert SMS to alerts software 120 for decoding and display.

At step 220 of flowchart 200, the twelfth character of the 160-character SMS message is set as a tracking character. This makes it possible to track the status of the message, such as whether the message has been read. Certain elements of the 160-character SMS (the twelfth character, for example) may be modified by alerts software 120 for the purpose of maintaining status or modifying or updating the properties of the alert.

At step 230 of flowchart 200, characters 13 and 14 of the 160-character SMS message are encoded with the type of rich-media alert contained in the SMS message. There may be various types of rich-media alerts, each corresponding to a set of graphics or multimedia elements, and a formatting protocol for their display. For example, an alert type may be a final score alert for a sporting event, a fantasy news alert, or a video alert. Graphics may include team logos or still pictures, for example, while multimedia elements may be video or audio clips, for example. The rich-media alert typing information encoded in characters 13 and 14 is similar to metadata, because it governs interpretation of the rich-media payload to follow. As a result, an embodiment of the present invention permits use of a display protocol for rich-media content that is effectively self-defining.

At step 240 of flowchart 200, characters 15 and 16 of the 160-character SMS message are encoded with the category of rich-media alert contained in the SMS message. As with alert types, there may be various categories of rich-media alert, each corresponding to a subset of graphics or multimedia elements. Where a rich-media alert is a sports alert, for example, an alert category may correspond to a specific sport such as collegiate basketball or professional football, for example. Specification of an alert category in characters 15 and 16 makes displaying rich-media elements more customizable and extensible by allowing a greater number of graphical treatments than would be the case without the additional level of alert specificity.

At step 250 of flowchart 200, characters 17-27 of the 160-character SMS message are used to record a reference time for the SMS message. A reference time might be the time that the event generating an alert occurred, for example. Reference time information is included in the SMS message partly so that the alerts software decoding it can expire messages properly. Expiration of messages is a discrimination function included in the rich-media application software, to prevent display of alerts that have become stale or irrelevant due to the passage of time since the message reference time. The expiration time for rich-media alerts encoded in SMS may be alert specific, for example, so that a news alert might expire more or less quickly than an emergency alert, for example. In one embodiment, alert expiration time may be user specific, in which case the alerts software might respond to data acquired through communication with a content server. Message expiration may occur because a mobile device has been turned off for an extended period of time, for example. Another reason for including reference time information within the body of a rich media alert may be so that alerts software can display that time to a user. It is worth noting that SMS networks do not guarantee delivery time for an SMS. While it may be important for a user to see what time the event giving rise to a rich-media alert occurred, and an embodiment of the present invention can convey that information, conventional SMS displays the time a message was actually delivered by the mobile network.

At step 260 of flowchart 200, characters 28-160 of the 160-character SMS message string are encoded with a rich-media alert payload. According to the present embodiment, previously described characters 1-27 may be static in that they can follow the same format for all exemplary alert types, and contain data and metadata governing display of the rich-media alert payload contained in characters 28-160. Rich-media payload may comprise text and graphics, for example, or combine multimedia graphical, video, and audio elements, for example.

Figure 3:
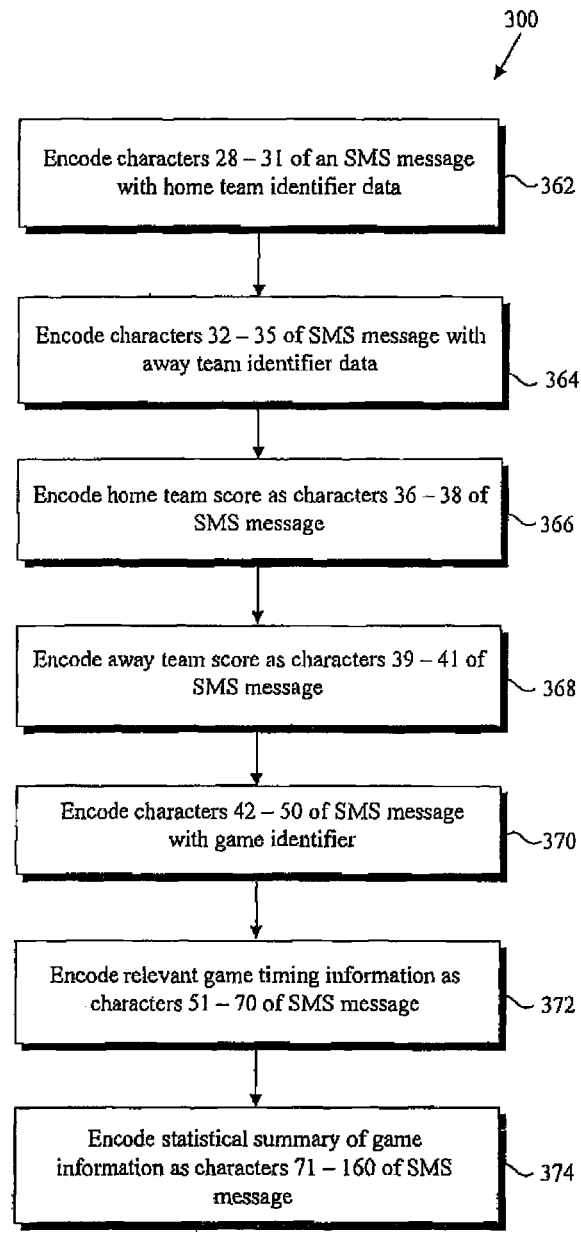
FIG. 3 illustrates a flowchart for encoding rich-media text and graphics content into the payload of a rich-media sports alert SMS, according to one embodiment of the present invention.

FIG. 3 shows flowchart 300, which illustrates the steps, according to one embodiment of the present invention, in which rich-media text and graphics content may be encoded into the payload of an exemplary rich-media sports alert SMS. Referring now to step 362 of flowchart 300, the first four characters of a 133-character rich-media payload, i.e. characters 28-31 of the 160-character SMS message, are used to identify the home team in a sports event generating a rich-media alert. Alerts software resident on a mobile device recognizes that characters 28-31 correspond to home team identification information, because metadata describing the rich-media alert type, and contained in characters 13 and 14 described in step 230 of FIG. 2 govern interpretation of payload content. Display of home team identification information may include display of a team logo, for example. The particular graphical element showing the logo is an external asset, because it requires retrieval of a display object that, while identified within the SMS message, resides outside of it. Such external assets may reside on a content server and/or on a mobile cache located on a mobile device.

At step 364 of flowchart 300, the fourth through seventh characters of a 133-character rich-media payload, i.e. characters 32-35 of the 160-character SMS message, are used to identify the away team in a sports event generating a rich-media alert. Similar to display of a home team identifier, discussed in step 362 of flowchart 300, display of away team identification information may include display of a team logo, for example. Location and retrieval of the appropriate graphics for the home and away teams are expedited by rich-media alert category information specifying a particular sport and contained in characters 15 and 16 described in step 240 of FIG. 2

At step 366 of flowchart 300, characters 36-38 of the 160-character SMS message are encoded with a home team score. An away team score follows as encoded characters 39-41, in step 368.

At step 370 of flowchart 300, characters 42-50 of the 160-character SMS message may be encoded with a game identifier and location for the sporting event giving rise to a rich-media alert SMS. Game identifier information may allow a user to interact with the alert by linking directly to game information available on a content server, on another application resident on the mobile device, to a WAP page, or to any other resource or service to which a mobile operating system can link.

At step 372 of flowchart 300, characters 51-70 of the 160-character SMS message are used to record relevant game timing information. Relevant game timing information might be the time remaining in a sporting event, for example, or the time of occurrence of the action generating the rich-media alert.

At step 374 of flowchart 300, remaining characters 71-160 of the 160-character SMS message are encoded with a game report, providing text or statistical information about game status or outcome, for example.

Figure 4:
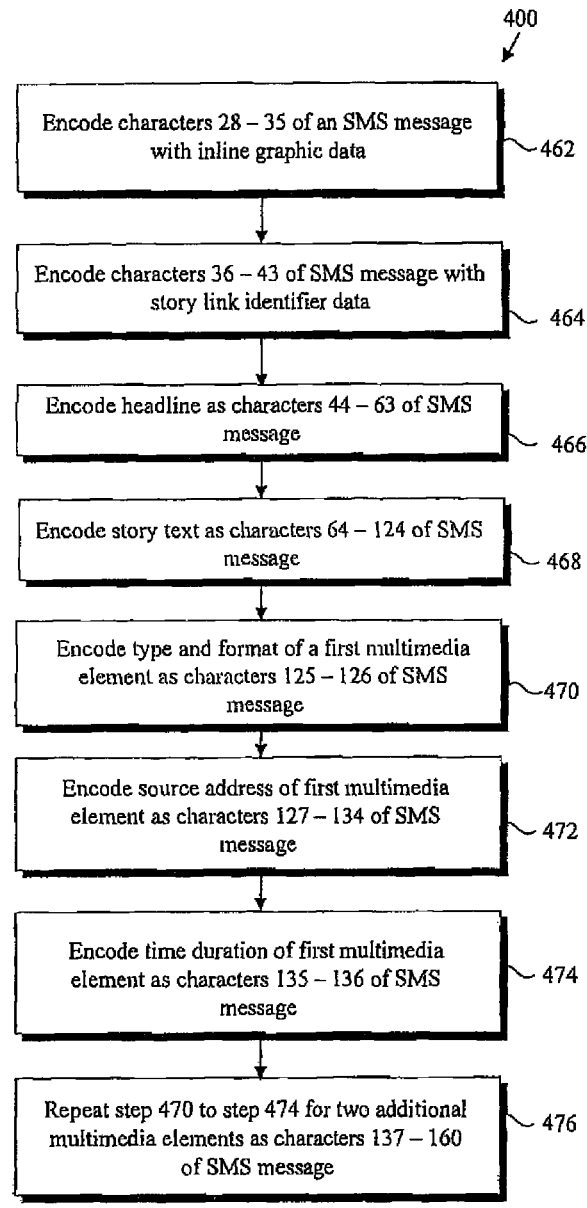
FIG. 4 illustrates a flowchart for combining and encoding multimedia graphical, video, and audio elements into the payload of a rich-media sports alert SMS, according to one embodiment of the present invention.

Turning now to FIG. 4, flowchart 400 describes the steps, according to one embodiment of the present invention, in which multimedia graphical, video, and audio elements may be combined and encoded into the payload of an exemplary rich-media sports alert via SMS.

At step 462 of flowchart 400, the first eight characters of a 133-character rich-media payload, i.e. characters 28-35 of the 160-character SMS message, are used to encode inline graphic data. As described in conjunction with discussion of step 362 in FIG. 3, alerts software resident on a mobile device recognizes that characters 28-35 correspond to inline graphic identification information because metadata describing the rich-media alert type, and contained in characters 13 and 14 described in step 230 of FIG. 2, govern interpretation of payload content. Display of rich-media alert inline graphics may comprise display of a particular still picture of an athlete, for example. The particular graphical element showing the image is an external asset, retrievable from a content server or directly from a mobile cache, as previously described.

At step 464 of flowchart 300, the ninth through sixteenth characters of a 133-character rich-media payload, i.e. characters 36-43 of the 160-character SMS message, may be encoded with a story identifier and location for the specific event giving rise to a rich-media alert SMS. Story identifier information may allow a user to interact with the alert by linking directly to a full story available on a content server, and available via packet network communication.

At step 466 of flowchart 400, characters 44-63 of the 160-character SMS message may be encoded with a text headline for the story accompanying a multimedia sequence. A text headline might read "Top Story," for example. Characters 64-124 may be encoded with story reportage in text format, at subsequent step 468.

At step 470 of flowchart 400, characters 125 and 126 may be used to encode the type and format of a first multimedia element in a multimedia sequence. Type and format data serve as metadata for the following encoded multimedia element by preparing the alerts software to display the element properly. Multimedia element type and format data may prepare the alerts software for display of a graphical PNG, JPG, or GIF element, for example, or a video 3GPP, or MP4 element, or audio MP3, AAC, or MIDI element, for example.

At step 472 of flowchart 400, characters 127-134 of the 160-character SMS message are encoded with a source address for a first multimedia element. That multimedia element, whether graphical, video, or audio, is an external asset, which may be retrieved via communication between a mobile device and a rich-media content server for example.

At step 474 of flowchart 400, characters 135-136 of the 160-character SMS message may be encoded with a time duration for a first multimedia element. Where a multimedia element is a video or audio clip, the duration of the clip is self-determining, Where, however, a graphical first element is displayed as part of a graphical still slideshow, for example, a multimedia element time duration would control how long a first element was displayed as part of a rich-media alert, before a following element in a multimedia sequence were to appear.

At step 476 of flowchart 400, characters 137-160 of the 160-character SMS message may be used to encode two additional multimedia elements, as described in previous steps 470-474. A multimedia sequence may contain any combination or any subset of three multimedia elements. A multimedia sequence may comprise a slideshow of multiple graphical elements, or a sequence of consecutive video clips, for example. In addition, where an audio element and video or graphical element are combined, the alerts software may include a protocol for their presentation. A video or graphical element followed immediately by an audio element might result in both being displayed simultaneously, for example.

Figure 5:
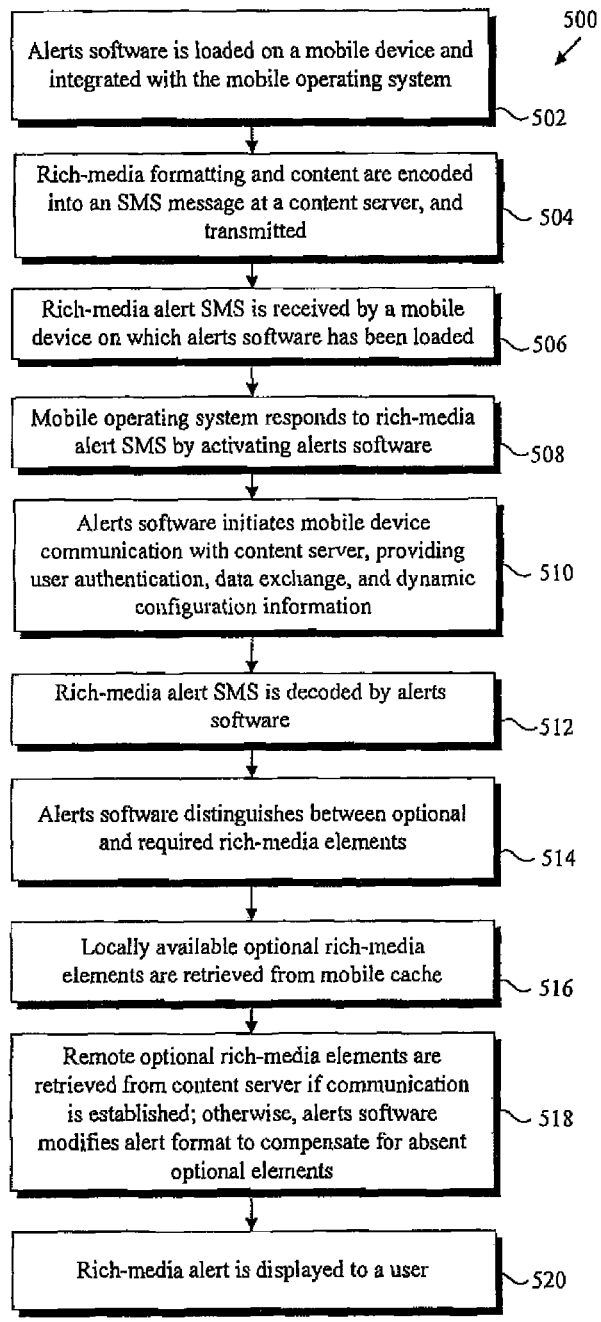
FIG. 5 illustrates a flowchart for sending and displaying rich-media alerts via SMS, according to one embodiment of the present invention.

FIG. 5 shows flowchart 500, which illustrates the steps of a method for sending and displaying rich-media alerts via SMS, according to one embodiment of the present invention. Although the present embodiment includes the entirety of a rich-media alert in a single SMS messages, other arrangements are possible. In one embodiment, rich-media content spans more than one SMS message. Regardless of the number of SMS messages required to display the rich-media alert, the format of the data contained within each SMS may be changed to include a sequence number, and/or an identifier that uniquely identifies the SMS. The message may also include an identifier of the sender(s) and/or the recipient(s) of the message.

Referring now to step 502 of flowchart 500 in FIG. 5, at step 502 of flowchart 500, alerts software is loaded on a mobile device and integrated with the mobile operating system.

At step 504 of flowchart 500, rich-media formatting and content are encoded into an SMS message. The encoding process involves recording data and metadata, as well as locator information for external assets, within the constraints imposed by a 160-character SMS message.

At step 506 of flowchart 500, a rich-media alert SMS message addressed to alerts software previously loaded on a mobile device, is received by a client device.

At step 508 of flowchart 500, a mobile operating system responds to a rich-media alert SMS by activating previously loaded alerts software. When a mobile device receives a rich-media alert SMS, the mobile operating system identifies the SMS message as intended for alerts software on the basis of the character string portion containing address information. The mobile operating system activates the alerts software, and routes the rich-media alert SMS to it for decoding and display.

At step 510 of flowchart 500, alerts software initiates communication with a content server, authenticating a user and beginning a data exchange process. In one embodiment, communication with a content server at step 510 elicits a content server response comprising fields for the alerts software version in use, whether an update for alerts software is available, and whether or not an update is required, as well as user verification, alert expiration time, and fields for dynamic configuration of a rich-media alert, for example. Dynamic configuration may comprise fields modifying a rich media display based on updating of an alert subsequent to its transmission, selectively including advertising information, and options to customize alert configuration to individual user parameters. For example, dynamic configuration might include instructions to include or omit particular rich-media elements encoded in an SMS as optional elements, or provide authorization for a user to forward a rich-media alert to other mobile devices, and log that activity.

Display of a rich-media alert received via SMS may go forward without the communication step described in step 510. Failure to execute step 510 may limit graphical content of a mobile display to elements previously loaded on a mobile device as part of the alerts software, or previously downloaded from a content server and stored on a mobile cache. Even in that case, however, encoding of an SMS message in accordance with one of the present embodiments results in display of enhanced rich-media components, when compared to conventional SMS messages.

At step 512 of flowchart 500, a rich media alert SMS is decoded by alerts software previously loaded on the mobile device.

At step 514 of flowchart 500, alerts software distinguishes between optional and required rich-media elements evoked by the decoded rich-media formatting instructions.

At step 516 of flowchart 500, rich-media graphical and multimedia elements specified during decoding of a rich-media SMS and stored locally on a mobile cache are retrieved at the mobile device. Step 516 reduces network traffic associated with retrieval of external assets from a content server.

At step 518 of flowchart 500, rich-media graphical and multimedia elements specified during decoding of a rich-media SMS and not stored on a mobile cache are retrieved remotely from a content server. Where content server communication is unavailable, alerts software integrates locally available external assets with text content received via SMS to compensate for the absent rich-media elements.

At step 520 of flowchart 500, a rich-media alert is displayed to a user of a mobile device.

Figure 6A:
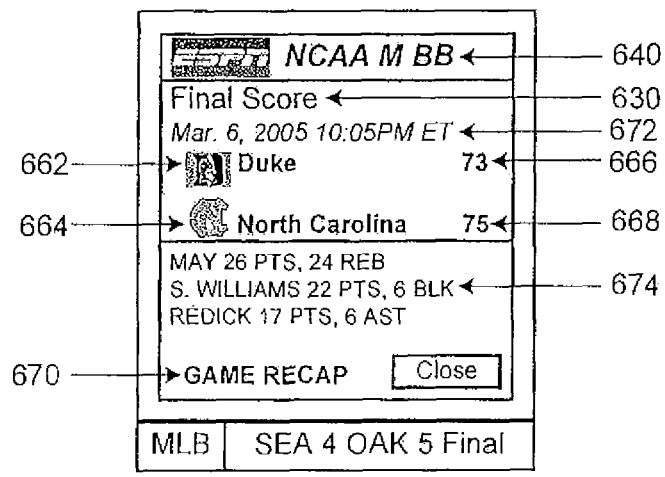
FIGS. 6A, 6B, and 6C illustrate rich-media alerts, according to embodiments of the present invention.

FIG. 6A shows exemplary rich-media alert 600a. Rich media alert type 630 corresponds to encoding step 230 in FIG. 2, and governs the formatting and presentation of rich-media alert 600a transmitted via SMS. In the present embodiment, alert type specifies a final score alert. Alert category 640, corresponds to encoding step 230 in FIG. 2, and expedites retrieval of graphical identifiers. In this example, alert category specifies NCAA men's basketball.

Payload data for rich-media alert 600a includes home team identifier 662 comprising team name and team logo corresponding to encoding step 362 in FIG. 3. Similarly, away team identifier 664 corresponds to encoding step 364. Also included in the payload are home team score 666 and away team score 668, corresponding to encoding steps 366 and 368, respectively. "GAME RECAP" 670 provides a user link to additional information on a content server, corresponding to encoding step 370 in FIG. 3. Relevant game timing information 672 is displayed as a result of encoding step 372. The remainder of the payload for rich-media alert 600a appears as text and statistical information about the game 674, and corresponds to encoding step 374.

Figure 6B:
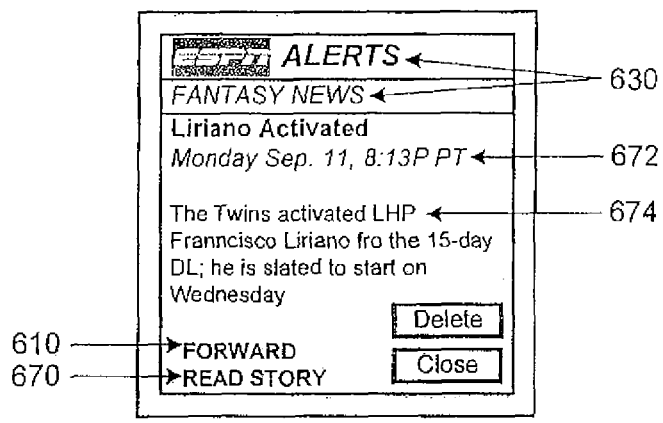

FIG. 6B shows exemplary rich-media alert 600b. Alert type 630 specifies this example as a fantasy news alert. Information received from a content server during dynamic configuration step 510 in FIG. 5 may allow a rich-media alert user to forward the alert by responding to prompt 610 in FIG. 6B. "READ STORY" 670 provides a user link to additional information on a content server, corresponding to encoding step 370 in FIG. 3. Relevant event timing information 672 is displayed as a result of encoding step 372. The remainder of the payload for rich-media alert 600b appears as text 674 corresponding to encoding step 374.

Figure 6C:
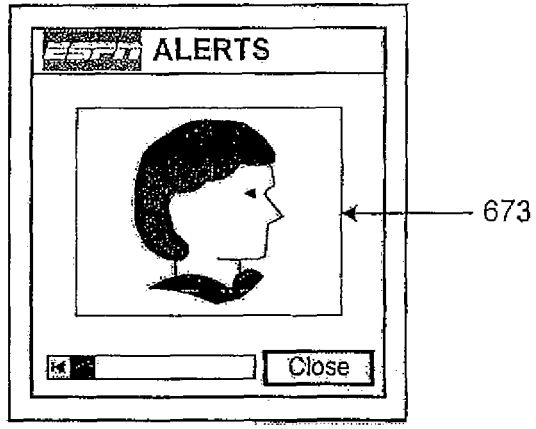

FIG. 6C shows exemplary rich-media video alert 600c. Video clip 673 may be a first, second, or third multimedia element, as described in steps 470-476 in FIG. 4. In one embodiment, a video element followed by an audio element results in both being played simultaneously. Video clip 673 and an associated audio element may be external assets retrieved from a remote content server, and identified in encoding step 472.

As described in the foregoing, a method and system for transmission and display of rich-media alerts via SMS results in display of multimedia elements unavailable through use of conventional techniques for communicating via SMS. Enhanced rich-media content is available with or without retrieval of remote multimedia elements from a content server. Consequently, the present invention enables users of mobile devices to obtain rich-media messages utilizing the popular, uniformly implemented, and cost effective SMS communication format.

From the above description of the invention it is manifest that various techniques can be used for implementing the concepts of the present invention without departing from its scope. Moreover, while the invention has been described with specific reference to certain embodiments, a person of ordinary skills in the art would recognize that changes can be made in form and detail without departing from the spirit and the scope of the invention. As such, the described embodiments are to be considered in all respects as illustrative and not restrictive. It should also be understood that the invention is not limited to the particular embodiments described herein, but is capable of many rearrangements, modifications, and substitutions without departing from the scope of the invention.

What is claimed is:

1. A method of processing a rich-media message by a mobile device having a display, a mobile device operating system and a software application, the method comprising:
   receiving the rich-media message over a network by the mobile device;
   depacketizing the rich-media message by the mobile device operating system to retrieve an encoded rich-media message and address data in the rich-media message; and
   activating the software application on the mobile device by the mobile device operating system based on the address data in the rich-media message;
   decoding the encoded rich-media message by the software application to generate rich-media content information;
   determining, using the rich-media content information, whether a rich-media element identified by the rich-media content information is resident on the mobile device; and
   if the determining determines that the rich-media element is resident on the mobile device, displaying the rich-media element on the display of the mobile device.

2. The method of claim 1, wherein the rich-media message is an alert, and wherein the software application is an alerts software application.

3. The method of claim 1 further comprising:
   if the determining determines that the rich-media element is not resident on the mobile device:
       determining a location external to the mobile device of the rich-media element, using the rich-media content information;
       retrieving the rich media element from the location external to the mobile device, using the rich-media content information; and
       displaying the rich-media element on the display of the mobile device.

4. The method of claim 3, wherein the location external to the mobile device is a content server.

5. The method of claim 4 further comprising:
   obtaining a rich-media content from the content server, based on the rich-media content information in the encoded rich-media message.

6. The method of claim 5, wherein the rich-media content includes at least one of a video clip, an audio clip and an inline graphic.

7. The method of claim 1, wherein the rich-media message is a short message service (SMS) message.

8. The method of claim 1, wherein the rich-media message is an alert, and wherein the alert includes a sports alert, a weather alert, a news alert, or a medical alert.

9. A method of processing a rich-media message by a mobile device having a display, a mobile device operating system and a software application, the method comprising:
   receiving the rich-media message over a network by the mobile device;
   depacketizing the rich-media message by the mobile device operating system to retrieve an encoded rich-media message and address data in the rich-media message; and
   activating the software application on the mobile device by the mobile device operating system based on the address data in the rich-media message;
   decoding the encoded rich-media message by the software application to generate rich-media content information;
   determining a location external to the mobile device of the rich-media element, using the rich-media content information;

retrieving the rich media element from the location external to the mobile device, using the rich-media content information; and displaying the rich-media element on the display of the mobile device.

10. The method of claim 9, wherein the rich-media message is an alert, and wherein the software application is an alerts software application.

11. The method of claim 9 further comprising:

determining, using the rich-media content information, whether a second rich-media element identified by the rich-media content information is resident on the mobile device; and if the determining determines that the second rich-media element is resident on the mobile device, displaying the second rich-media element on the display of the mobile device.

12. The method of claim 9, wherein the location external to the mobile device is a content server.

13. The method of claim 12 further comprising:

obtaining a rich-media content from the content server, based on the rich-media content information in the encoded rich-media message.

14. The method of claim 13, wherein the rich-media content includes at least one of a video clip, an audio clip and an inline graphic.

15. The method of claim 9, wherein the rich-media message is a short message service (SMS) message.

16. The method of claim 9, wherein the rich-media message is an alert, and wherein the alert includes a sports alert, a weather alert, a news alert, or a medical alert.

17. A mobile device for processing a rich-media message, the mobile device comprising:

a display;
a mobile device operating system; and
a software application;

wherein the mobile device is configured to:

receive the rich-media message over a network;

depacketize the rich-media message, using the mobile device operating system, to retrieve an encoded rich-media message and address data in the rich-media message; and activate the software application on the mobile device, using the mobile device operating system, based on the address data in the rich-media message;

decode the encoded rich-media message, using the software application, to generate rich-media content information;

determine a location external to the mobile device of the rich-media element, using the rich-media content information;

retrieve the rich media element from the location external to the mobile device, using the rich-media content information; and display the rich-media element on the display.

18. The mobile device of claim 17, wherein the mobile device is further configured to:

determine, using the rich-media content information, whether a second rich-media element identified by the rich-media content information is resident on the mobile device; and if the determining determines that the second rich-media element is resident on the mobile device, display the second rich-media element on the display.

19. The mobile device of claim 17, wherein the mobile device is further configured to obtain a rich-media content from the location external to the mobile device, based on the rich-media content information in the encoded rich-media message.

20. The mobile device of claim 19, wherein the rich-media content includes at least one of a video clip, an audio clip and an inline graphic.

* * * * *